A. CHABOT.
Water-Valve.

No. 163,457.    Patented May 18, 1875.

WITNESSES
Geo Pardy
D. P. Twitov

INVENTOR
Anthony Chabot
per his atty.
F. Monteverde

UNITED STATES PATENT OFFICE.

ANTHONY CHABOT, OF SAN FRANCISCO, CALIFORNIA.

IMPROVEMENT IN WATER-VALVES.

Specification forming part of Letters Patent No. 163,457, dated May 18, 1875; application filed January 21, 1875.

*To all whom it may concern:*

Be it known that I, ANTHONY CHABOT, of the city and county of San Francisco, State of California, have invented an Improvement in Water-Valves, of which the following is a specification:

My invention relates to valves for water-reservoirs.

Figure 1:
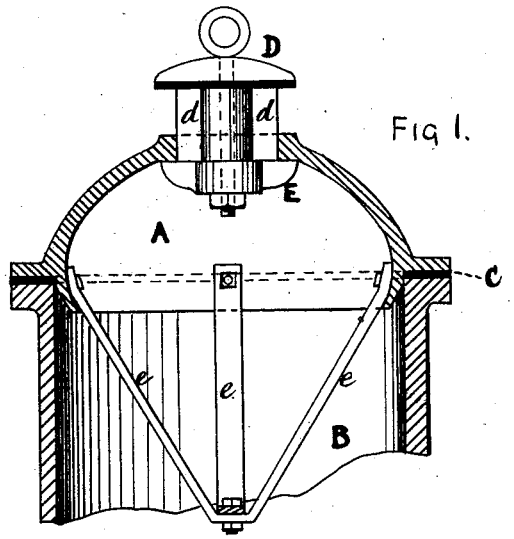
Figure 2:
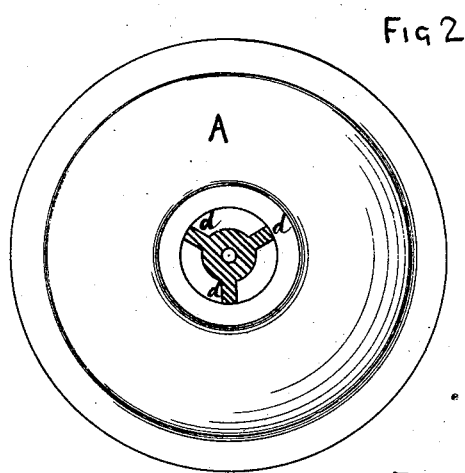
Figure 3:
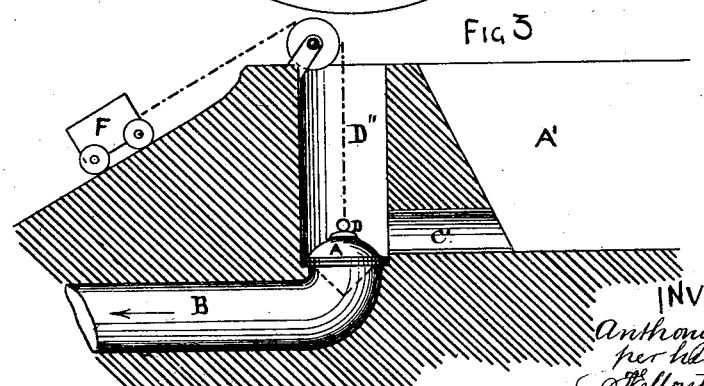

Referring to the drawing forming part of this specification, Figure 1 is a sectional elevation of my improved valve. Fig. 2 is a plan of same. Fig. 3 shows the application of my improved valve to the discharge-pipe of a reservoir.

A is the main valve, resting on the flange or mouth of delivery-pipe B, which forms its seat. C is a rubber packing or cushion attached to the under face of the valve, which makes an air-tight joint. D is the smaller or equalizing valve, which sits upon the top of the large valve A, which latter has a suitable plane surface for the valve D to seat upon. This valve is also supplied with a rubber gasket or cushion in the same manner as the larger valve. It is also supplied with three or more feather-guides, $d\ d$, which keep it from being pushed aside by the action of the water. E is a cross-bar, by which the main valve A is raised when the smaller valve is pulled up, the bar catching on the inner side of the main valve, thus lifting it out of its seat.

The operation is as follows: The smaller valve, which is only sufficiently large so as to be easily lifted from its seat, is pulled up, the water rushing in to fill the pipe through the spaces between the guiding-feathers, the pipe being filled up to its full capacity, when it is either closed at its outer extremity, or, as I prefer and is best to do, to close it at a short distance away from the valves A and D by any simple contrivance, such as a common gate or cock, which, when closed, will allow the pipe B to fill up in a more or less space of time, according to the distance the stoppage in it is placed from the valves A and D. The pipe thus filled up, the pressure upon the main valve will be equalized by its being entirely surrounded by the water. It will then only be necessary to exert a force sufficient to lift its actual weight. In dropping the valves back to their place, the smaller one will be easily guided by its feathers. The large valve is supplied with other guide-bands, $e$, projecting from its inner edges, and meeting below it in the shape of a cone, which, when the valve happens to be lowered a little to one side of its seat, will first strike upon these guides and slide squarely onto its seat.

In using my valve I prefer to construct a shaft, $D''$, at the bottom of which I place my valve. The delivery-pipe $C'$ from the reservoir $A'$ empties above the valve, filling the shaft to its level, thus keeping the water over the valve, keeping it firmly upon its seat. To the upper part of the small valve D is attached a rope or chain, passing over a suitable pulley at the top of the shaft, and having attached at its extremity a weight sufficient to balance the valves. In this case I prefer using a small car, F, running on an incline, and loaded sufficiently for the purpose. When the valves are lifted the water from the reservoir will pass out through pipe $C'$ into the delivery-pipe B, thence to the place of destination.

I claim—

The valve A, with its equalizing-valve D, seating over pipe B, for the purpose as specified.

A. CHABOT.

Witnesses:
F. E. MONTEVERDE,
GEO. PARDY.